United States Patent [19]

Kendall et al.

[11] 4,147,316
[45] Apr. 3, 1979

[54] AIRCRAFT LANDING GEAR ASSEMBLY

[75] Inventors: Giles A. Kendall, Burbank; Robert Minick, Paso Robles, both of Calif.

[73] Assignee: Menasco Manufacturing Company, Burbank, Calif.

[21] Appl. No.: 823,923

[22] Filed: Aug. 12, 1977

[51] Int. Cl.² ............................................. B64C 25/18
[52] U.S. Cl. ................................................. 244/102 R
[58] Field of Search ....... 244/102 R, 102 SL, 102 SS, 244/102 A, 104 R, 104 FP, 109 R

[56] References Cited

U.S. PATENT DOCUMENTS

| 2,351,215 | 6/1944 | Kleinhans | 244/102 R |
| 3,533,580 | 10/1970 | Lucien | 244/102 R |
| 3,822,048 | 7/1974 | Hartel | 244/102 R |

FOREIGN PATENT DOCUMENTS

| 901639 | 8/1945 | France | 244/102 R |
| 781892 | 8/1957 | United Kingdom | 244/102 R |
| 1239919 | 7/1971 | United Kingdom | 244/102 R |

Primary Examiner—Galen L. Barefoot
Attorney, Agent, or Firm—Robert E. Geauque

[57] ABSTRACT

An aircraft landing gear assembly which is to be movable from a retracted position within the fuselage of the aircraft to a position extended outwardly from the fuselage of the aircraft. The landing gear assembly includes a main supporting strut leg assembly to which is pivotly secured a wheel lever assembly. The tire assembly is pivotly mounted upon the free end of the wheel lever assembly about an axis which is angularly disposed with respect to the longitudinal center axis of the tire assembly. A linkage assembly connects with the tire assembly to plane the tire to a different angular position with the landing gear assembly in the retracted position. A side brace assembly, to provide lateral support, is piovtly interconnected between the strut leg assembly and the aircraft. The side brace assembly comprises a pair of members which are foldable upon themselves when the landing gear is retracted. The side brace assembly includes a jury strut which functions to lock the side brace assembly with the landing gear in the extended position.

11 Claims, 8 Drawing Figures

AIRCRAFT LANDING GEAR ASSEMBLY

BACKGROUND OF THE INVENTION

The field of this invention relates to an aircraft, and more particularly to a retractable landing gear assembly designed primarily for use upon a carrier based aircraft.

Retractable landing gear assemblies for aircraft have long been known. With the designing of new each type of aircraft, there is required a new design of an aircraft landing gear assembly. The reason for this is that the requirements of each new type of aircraft are not the same as a previous aircraft and therefore a past designed landing gear assembly is not able to be incorporated within the newly designed aircraft.

SUMMARY OF THE INVENTION

The landing gear assembly of this invention includes a conventional main supporting member, which is generally defined as a strut leg assembly which is to be pivotly connected along a pivot axis to the fuselage of the aircraft. It is to be understood that this connection will be within the area of the stowed position of the landing gear when the aircraft is in flight. The free end of the strut leg assembly is pivotly connected to a wheel lever assembly. A shock absorber assembly is interconnected between the strut leg assembly and the wheel lever assembly to absorb forces encountered during landing and taxiing of the aircraft. A short axle is pivotly mounted within the free end of the wheel lever assembly. The short axle is fixed to the tire supporting axle. The longitudinal center axis of the tire supporting axle is canted or angularly disposed with respect to the longitudinal center axis of the short axle. A linkage assembly interconnects with the short axle and the strut leg assembly. The linkage assembly automatically, during retraction of the landing gear, causes pivoting of the short axle which results in planing of the tire to a different angular position so as to be completely enclosed within the stowed space within the aircraft's fuselage yet only taking up a minimum amount of space. A side brace assembly interconnects with a strut leg assembly and the fuselage of the aircraft to provide lateral support for the landing gear assembly when in the extended position. The side brace assembly is pivotly mounted to both the strut leg assembly and the aircraft fuselage. The side brace assembly is composed primarily of a pair of members which are pivotly connected together. These members are substantially in an in-line locked position with the landing gear extended and are folded over in substantially an adjacent position with the landing gear retracted. A separate jury strut assembly is attached between the members of the side brace assembly and functions to lock the side brace assembly when in the extended position. The jury strut assembly includes a pair of members which are pivotly connected together with the movement of such being an overcenter type of toggle action. By the incorporation of the overcenter type of toggle action, the tendency of the side brace assembly is to remain locked when in the locked position and to remain unlocked when in the unlocked position.

The primary objective of the landing gear assembly of this invention is to construct a landing gear assembly for a specific type of carrier-based aircraft and have the landing gear assembly be fully capable of absorbing all loads normally encountered in the landing procedure of the aircraft and to also have the landing gear assembly retract into a quite small volume of space within the fuselage of the aircraft when the aircraft is in flight.

BRIEF DESCRIPTION OF THE SHOWN EMBODIMENT

Figure 1:
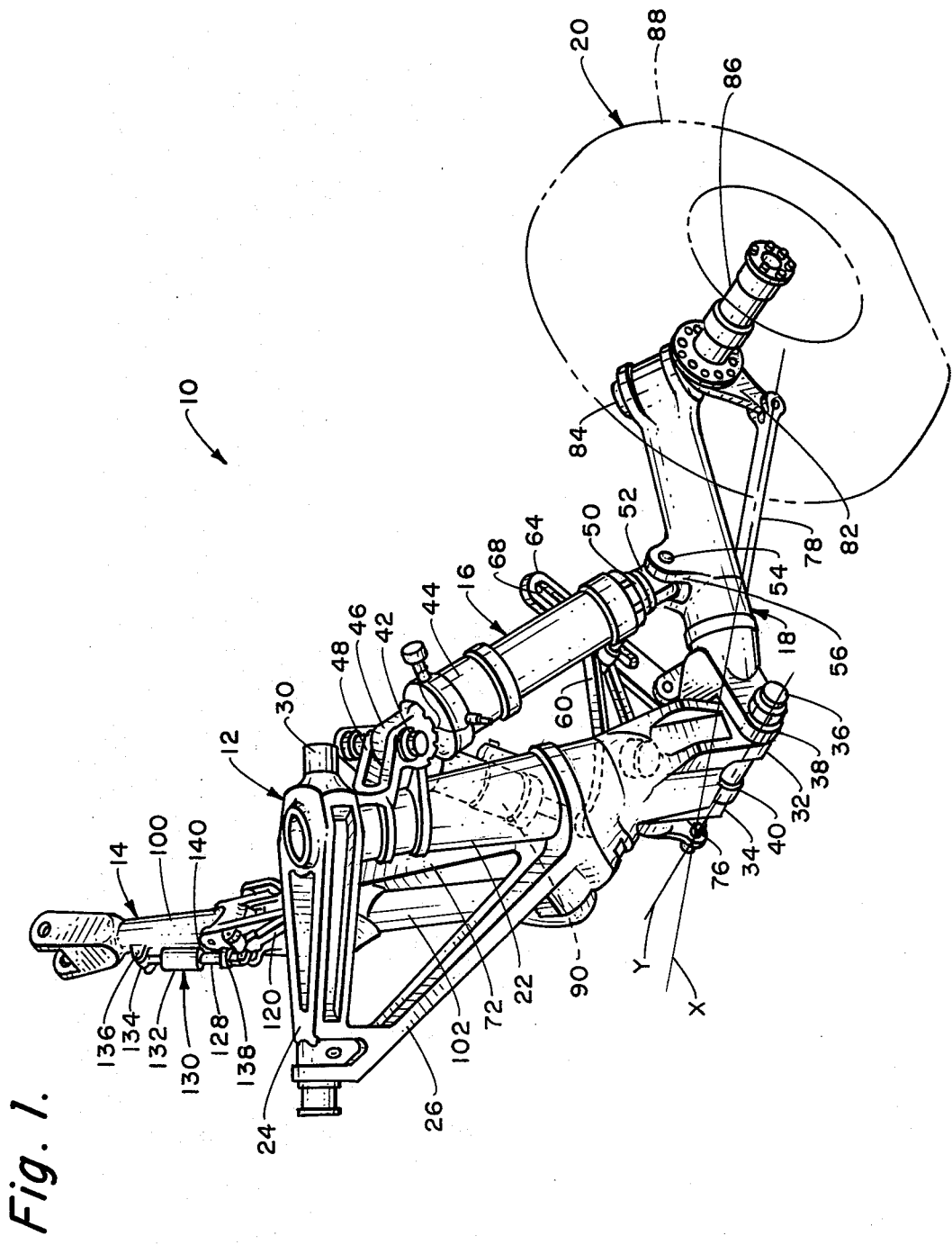
FIG. 1 is an overall isometric view of the landing gear assembly of this invention.

Referring particularly to the drawings, there is shown the aircraft landing gear 10 of this invention which is composed generally of a strut leg assembly 12, a side brace assembly 14, a shock absorber assembly 16, a wheel lever assembly 18 and a tire assembly 20. The foregoing structural components are precisely interconnected together and preselected to be of specific sizes so that the overall landing gear assembly 10 will retract in the desired manner and be stowed properly within the wheel well envelope of the aircraft. A further consideration of the structure of this invention is that the landing gear assembly has been specifically designed so that during the extension movement and the retraction movement, at no time will any portion of the landing gear structure contact any of the aircraft structure itself including aircraft supported items, such as fuel tanks and missiles. The aforementioned individual structural assemblies will now be explained in greater detail within the following description.

The strut leg assembly 12 is basically triangular in shape and includes a main load supporting member 22 interconnected by a top member 24 and a side member 26. The members 22, 24 and 26 are constructed of a single integral piece to achieve maximum strength of the assembly. The top member 24 has an opening 28 therethrough. Within the opening 28 is conducted a first structural pin 30. The pin 30 is to pivotally mount the strut leg assembly 12 within the fuselage of the aircraft.

The unattached end of the structural leg assembly 12 is bifurcated forming legs 32 and 34. Each of the legs 32 and 34 includes an opening therein through which a pivot pin 36 is conducted.

The pivot pin 36 is also conducted through legs 38 and 40 of the bifurcated end of the wheel lever assembly 18. As a result, the strut leg assembly is pivotly connected to the wheel lever assembly and the wheel lever assembly is capable of moving in the vertical position (referring to FIG. 1) toward and away from the strut leg assembly 12. It is to be understood that the strut leg assembly 12, when the landing gear is extended, functions as a rigid post.

Pivotly attached by a pivot pin 42 is the housing 44 of the shock absorber assembly 16. The housing 44 is so formed to include a flange 46 through which is an opening. The pin 42 is conducted through the opening within the flange 46 with the flange 46 located in a close-fitting relationship between a pair of spaced apart legs of an attaching bracket 48. The attaching bracket 48 is integrally formed upon the main member 22 with the strut leg assembly 12.

The piston assembly 50 of the shock absorber assembly 16 is slidably mounted within the housing 44. The piston assembly 50 has integrally formed thereto a flange 52 which similarly includes an opening therethrough. A pivot pin 54 is to be conducted through the opening in the flange 52. The flange 52 is to be located between the legs of the bifurcated bracket 56. The bracket 56 is integrally formed upon the wheel lever assembly 18.

By the foregoing description, it can be seen that as the wheel lever assembly 18 moves toward and away from the strut leg assembly 12, the piston 50 will move within the housing 44 of the shock absorber assembly 16. The shock absorber 16 will function to damp the loads encountered by the aircraft during landing. It is envisioned that the shock absorber design will be a combination of an air-oil unit which provides landing and taxiing energy absorption by the passage of oil through an orifice, with nitrogen being used as the elastic medium to restore the unsprung parts to their extended position. An example of this type of shock absorber is described in detail within U.S. Patent No. 3,363,894 assigned to the assignee of this invention. However, it is considered to be within the scope of this invention that other shock absorber configurations could be employed, if desired.

Pivotly mounted by means of a pivot pin 58 to the main member 22 is a triangular shaped link 60. Each corner of the link 60 is pivotly connected through an appropriate pivot pin to a separate member. In particular reference, the one corner of the link 60 is connected through a pin 62 to a guide link 64. The free end of the guide link 64 is pivotly connected through a pin 66 to the wheel lever assembly 18. The pin 62 rides within an elongated slot 68 formed within the guide link 64. The function of the guide link 64 will be explained further on in the specification.

Another corner of the link 60 is pivotly connected through a pin 70 to a link rod 72. The free end of the link rod 72 is pivotly connected through a pin 74 to the aircraft structure. The function of the link rod 72 will also be explained further on in the specification.

The remaining corner of the link 60 is pivotly attached through a pin 76 to a second link rod 78. The free end of the link 78 is pivotly connected by means of a pin 80 to a member 82. The member 82 is fixedly secured to a short axle 84. The axle 84 extends through an opening provided within the free end of the wheel lever assembly 18. The short axle 84 is readily capable of a limited amount of pivoting movement in respect thereto.

The longitudinal center axis of the short axle 84 is angularly disposed or canted with respect to the longitudinal center axis of the tire supporting axle 86. The tire supporting axle 86 is fixed to the short axle 84. Upon the tire supporting axle 86 is to be rotatably mounted the tire 88.

Upon moving of the second link 78, the member 82 produces a limited amount of pivoting movement of the short axle 84. In the pivoting of the axle 84 the angular disposition of the axle 86 changes. As a result, the plane of the tire, in essence, changes. The reason for this tire planing requirement is that it was found that with the tire in the stowed position it was required, to keep a portion of the tire from extending exteriorly of the fuselage of the aircraft, that the plane of the tire would have to be altered from the position in respect to the main strut assembly. Therefore, during retraction of the landing gear, the link rod 72 causes the link 60 to pivot slightly about the pivot pin 58. This, in turn, causes extension of the second link rod 78, acting through member 82, to produce slight pivoting of the short axle 84. This results in moving the tire 88 to a different desired plane which results in the tire being stored within the aircraft occupying a minimum amount of space.

The guide link 64 functions to limit the outward (or downward) movement of the wheel lever assembly 18 with respect to the strut leg assembly 12. This occurs due to the cooperation of the pin 62 within the slot 66.

With the landing gear assembly in the extended position, as the tire 88 moves across a runway, the entire aircraft including supporting member 22 will move relative to the wheel lever assembly 18 and the tire assembly 20. This movement is reciprocal or oscillatory with the movement being damped by the shock absorber assembly 16. During this movement, it is necessary that the tire 88 not plane but stay in the established plane with respect to the runway. In order to achieve this end, the second link rod 78 must be fixed relative to the wheel lever assembly 18. In order to accomplish this, the longitudinal axis X of the second link 78 passes through a point on the longitudinal center axis of the pin 76. The longitudinal center axis Y of the pivot pin 36 also passes through the aforementioned point. This occurs only with the landing gear assembly in the extended position. As a result, the wheel lever assembly 18 and the link 78 move in unison in respect to the supporting member 22. Therefore, since the wheel lever assembly 18 and the link 78 move in unison, there will not be any planing of the tire 88 as the tire 88 moves across the runway.

When the landing gear assembly is installed within the aircraft, a retract actuator assembly 90, which is hydraulically operated, is interconnected between pivot pins 70 and 42. The actuator 90 takes the form of a conventional hydraulically operated actuator and through appropriate extension or retraction of the actuator 90 the landing gear assembly is easily extended or retracted, respectively. The actuator 90 employs the use of a conventional housing 92 within which is a piston (not shown) which is connected to a piston rod 94. The piston rod 94 is fixed to a bifurcated bracket 96 which, in turn, is pivotly mounted upon the pivot pin 70. A flange 98 is provided on the housing 92 to facilitate connection to the pivot pin 42.

When the landing gear assembly is in the extended or down position, it is required to positively laterally support the landing gear. In order to accomplish this, the side brace assembly 14 is employed.

Basically, the side brace assembly 14 is composed of a first link member 100 and a second link member 102. Member 100 is pivotly mounted by means of a pin 104 to a pivot pin A which is pivotably mounted in fixed structure 106 which forms part of the fuselage of the aircraft. The nut B retains pin A in structure 106. The opposite end of the first member 100 is pivotly attached by means of pin 108 to the second member 102. This area of connection about pin 108 is what will be termed the "knee joint". It is to be noted that both members 102 and 100 in the area of the knee joint are significantly bifurcated forming an enlarged cooperating opening therebetween. The reason for this will be explained further on in the specification.

The outermost end of the member 102 is pivotly attached by means of a pivot pin 110 to pivot pin C which is pivotably mounted in strut leg assembly 12 and retained by nut D.

Integrally formed with the member 102 is a flange 112. The flange 112 has an opening therethrough through which is conducted a pin 114. The flange 112 is attached to a hollow cylindrical shaped section through which is conducted the pin 108.

A first jury link 116 is pivotly mounted by pin 114 to the flange 112. The free end of the first jury link 116 is pivotly attached by a pivot pin 118 to a second jury link 120. The second jury link 120 is basically L-shaped with the leg of the L-shaped link terminating at pin 118 and a pin 122 extending through the second jury link 120 at the apex of the L. Pin 122 is pivotly mounted within a bracket 124 which is formed integral with the first member 100. The short leg of the L-shaped second jury link 120 is attached by pivot pin 126 to the piston rod 128 of a hydraulic actuator 130. The actuator 130 is to be basically of a conventional type of hydraulic piston operated actuator. The housing 132 of the actuator 130 is attached by a pivot pin 132 to a bracket 136. The bracket 136 is integrally formed upon the first member 100. Fixedly mounted on the piston rod 128 is an annular stop 138. Located between the stop 138 and the open end of the housing 132 and about the piston rod 128 is a coil spring 140. The function of the spring 140 as well as the entire jury structure will be described in the following description.

Figure 4:
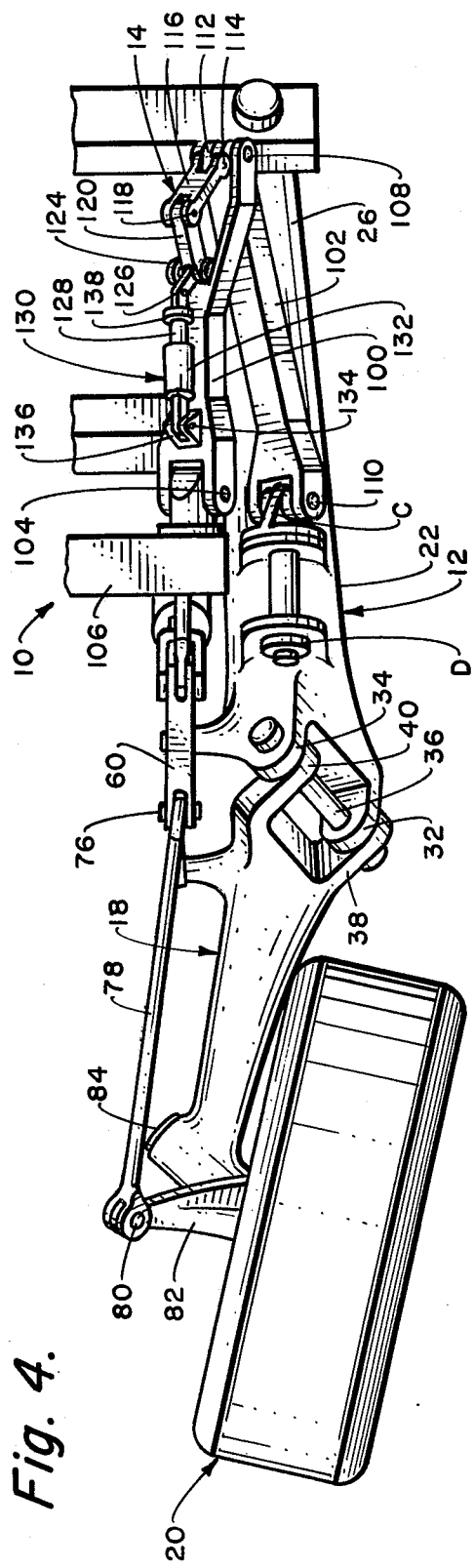
FIG. 4 is a view of the landing gear assembly in the retracted position taken along line 4—4 of FIG. 2.
Figure 5:
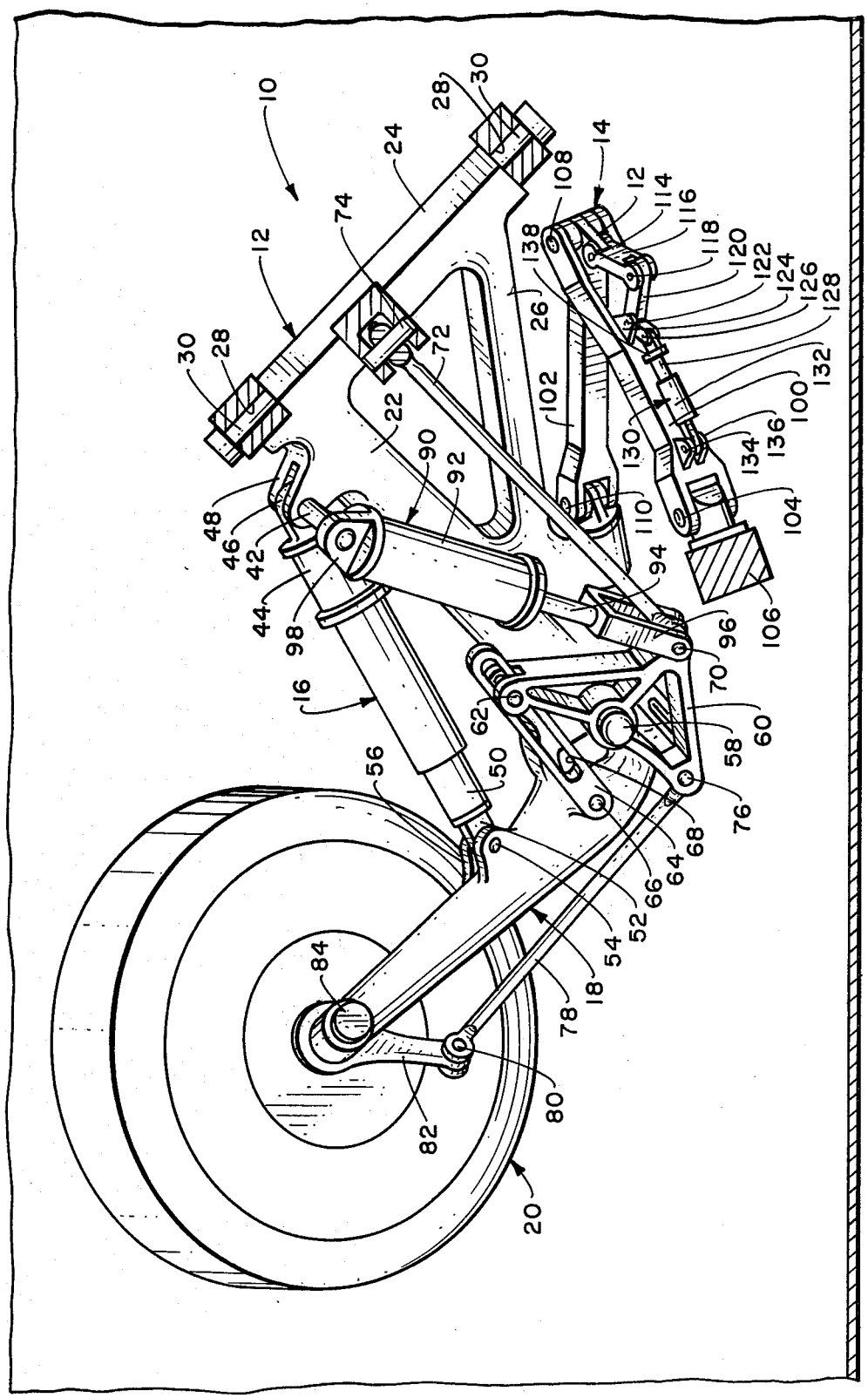
FIG. 5 is a view similar to FIG. 2 but showing the landing gear assembly in the approximate half-way extended position.
Figure 6:
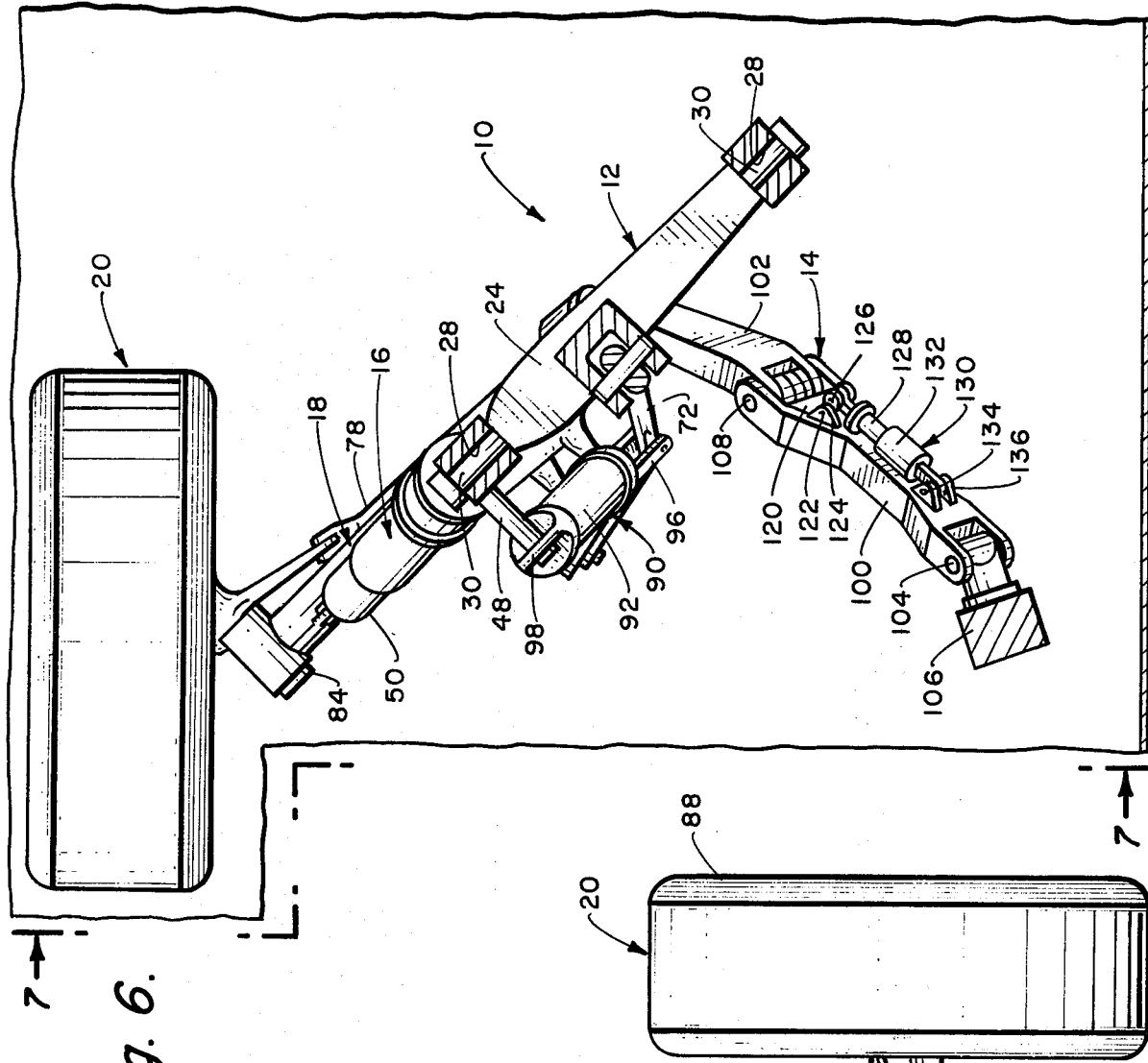
FIG. 6 is a view from the same position as FIG. 2 but showing the landing gear in the down or completely extended position.
Figure 8:
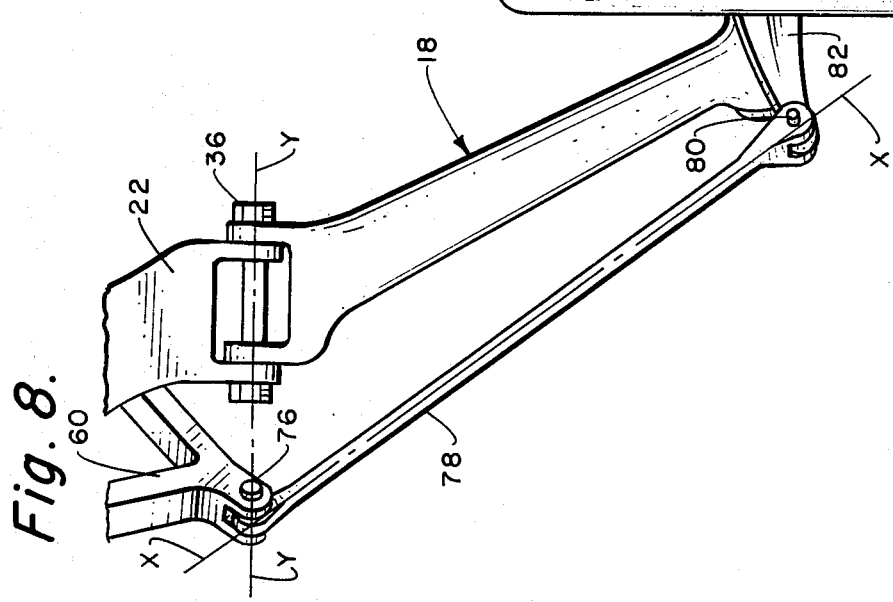
FIG. 8 is a partial rear view of the landing gear assembly in the extending position.
Figure 7:
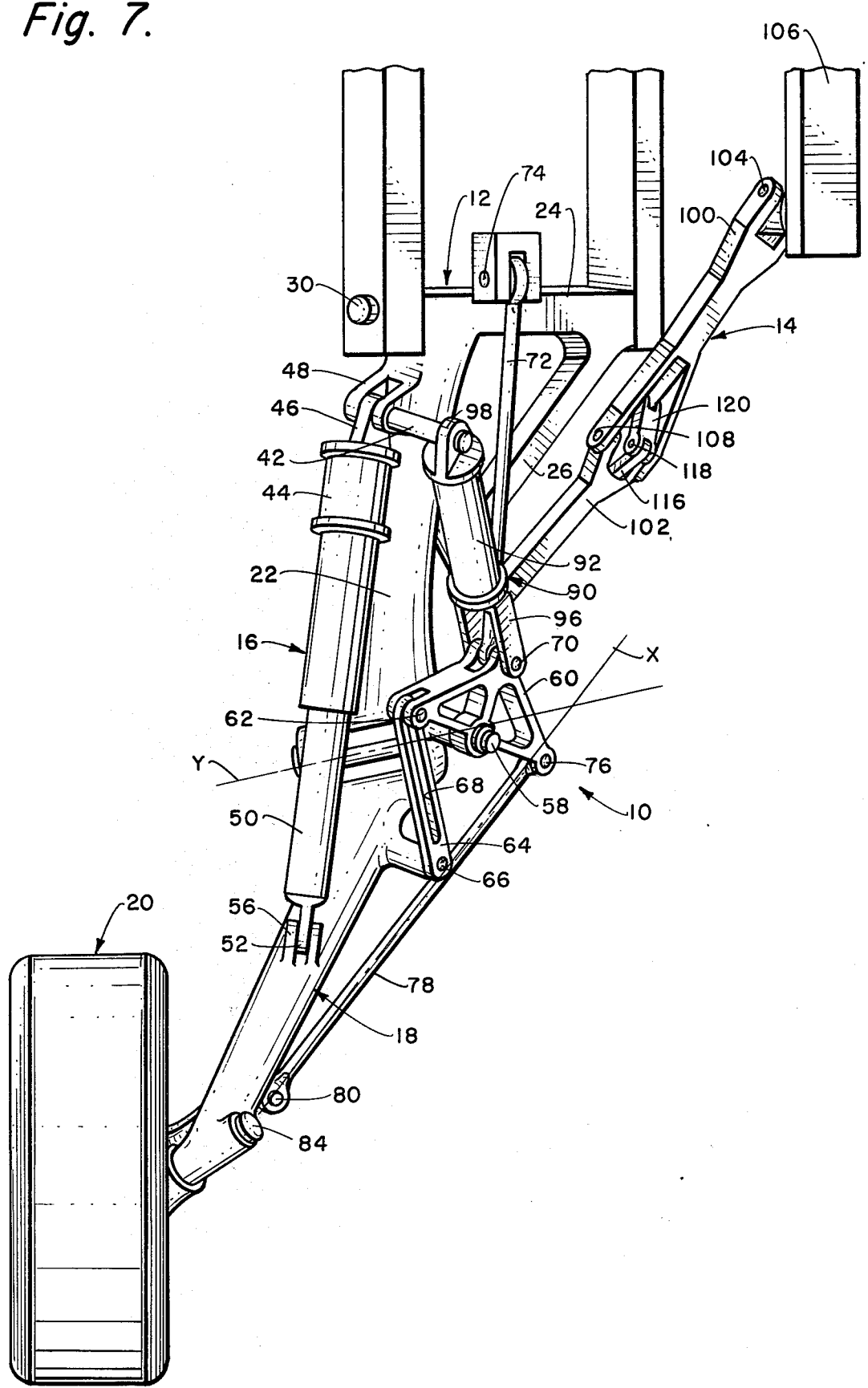
FIG. 7 is a view of the extended landing gear from the rear of the aircraft looking forward.

With the landing gear in the retracted position, such as shown in FIG. 4 of the drawings, the members 100 and 102 are folded upon each other in basically a side by side relationship. In this position the jury links 116 and 120 are angularly disposed relative to each other and extend in an outward direction from the member 100.

In the movement of the landing gear to the downward extended position, the jury links 116 and 120 initially become more angularly disposed relative to each other and actually assume somewhat of a right angle. Further movement toward the down position results in the links 116 and 120 assuming a more in-line position, but, however, still broken slightly angularly in the outward direction. This position is assumed with the landing gear in the completely down position.

However, in this position, the landing gear is not locked laterally as the side brace assembly still could "break" at the knee joint. In order to lock the knee joint of the side brace assembly, a small force is applied to the short leg of the second jury link 120 which results in the second jury link 120 pivoting inward toward the enlarged opening within the member 100. This pivoting motion causes the jury links 116 and 120 to move past an overcenter position with the natural action between the links 116 and 120 tending to maintain the links in this overcenter position. Once in this overcenter position, further inward movement of the links 120 and 116 is prevented due to the fact that piston rod 128 has "bottomed out". Because the links 120 and 116 are therefore in a fixed, extended position, operation of the "knee joint" is not possible and members 100 and 102 are also locked. In essence, the members 100 and 102 form a fixed member. Therefore, the landing gear assembly of this invention is secured in the lateral direction.

Figure 2:
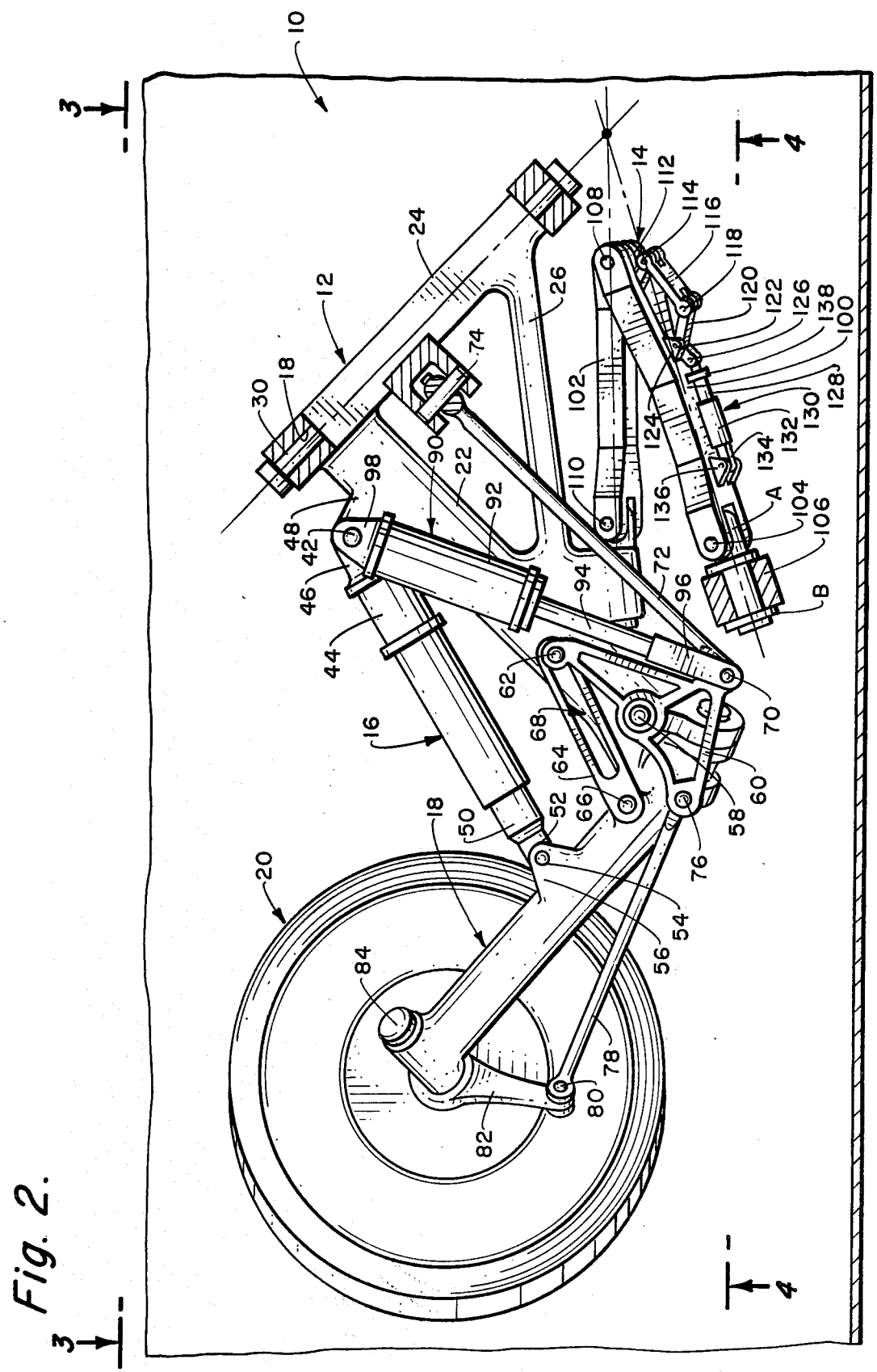
FIG. 2 is a plan view (from within the aircraft) looking downward at the landing gear assembly in the retracted, stowed position.
Figure 3:
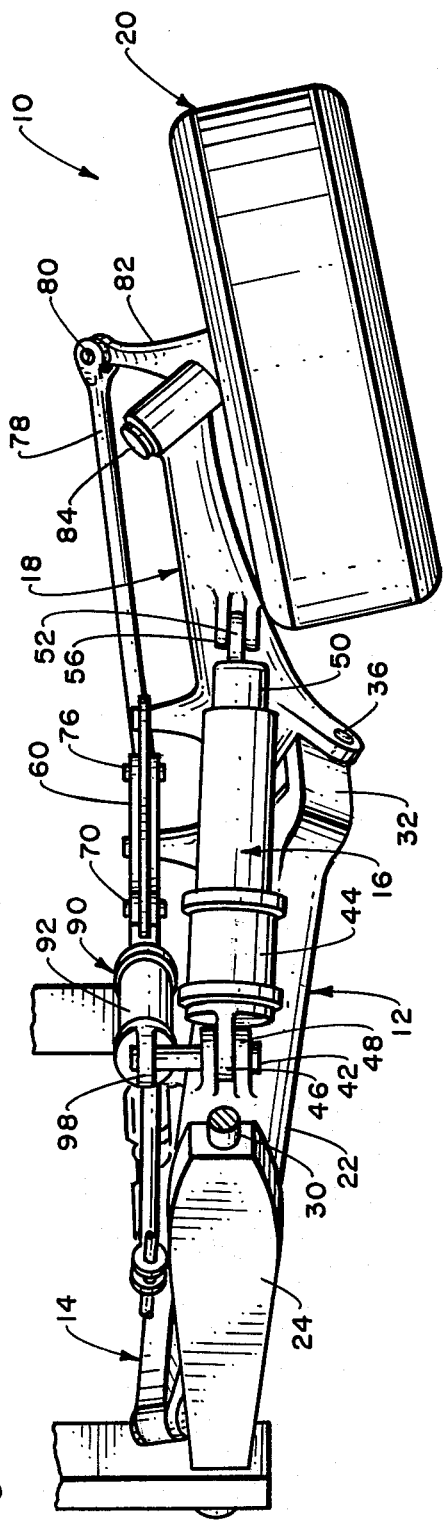
FIG. 3 is a view of the landing gear assembly in the retracted position taken along line 3—3 of FIG. 2.

When it is desired to retract the landing gear, the actuator 130 is activated causing the movement of the piston rod 128 to within the housing 132. The force of this movement is sufficient to overcome the bias of the spring 140. This movement continues until the links 116 and 120 are pivoted sufficiently to be moved past the overcenter position and assume an outward angular relation (such as is shown within FIG. 2). At this time, the "knee joint" can be activated and the members 100 and 102 are capable of pivoting relative to each other. At this particular time, the retract actuator 90 is placed into operation which causes the landing gear assembly to retract within the wheel well envelope of the fuselage of the aircraft.

What is claimed is:

1. A collapsible aircraft landing gear assembly movable between a retracted position and an extended position, said landing gear assembly comprising:

a strut leg assembly comprised of a solid, elongated member having an upper end and a lower end, said upper end adapted to be pivotly mounted to the aircraft;

a wheel lever assembly having a first end and a second end, said first end being pivotly connected to said lower end of said strut leg assembly establishing a first pivot axis;

a tire supporting axle attached to a short axle, the longitudinal center axis of said tire supporting axle being angularly disposed to the longitudinal center axis of said short axle, said short axle being pivotly mounted on said second end of said wheel lever assembly, means for pivoting said short axle relative to said wheel lever assembly thereby causing said tire supporting axle to be located in different angular positions relative to said wheel lever assembly;

a shock absorber assembly interconnecting said wheel lever assembly and said strut leg assembly;

a side brace assembly, one end of which is pivotly connected to said strut leg assembly and the other end of which is adapted to be pivotly connected to the aircraft; and with said landing gear assembly in said extended position said wheel lever assembly to reciprocally pivot relative to said strut leg assembly thereby causing said tire supporting axle to oscillate relative to said strut leg assembly, means for maintaining said longitudinal center axis of said tire supporting axle parallel during the oscillation of said tire supporting axle.

2. The aircraft landing gear assembly as defined in claim 1 wherein said means for pivoting of said short axle comprises:

a first member fixedly secured to said short axle, a linkage assembly interconnecting said first member and said strut leg assembly, in the movement of said landing gear assembly between the extended position and the retracted position said linkage assembly through said first member causes the pivoting of said short axle, with said landing gear in the extended position said short axle occupying a first preestablished position, with said landing gear assembly in the retracted position said short axle being located in a second preestablished position.

3. The aircraft landing gear assembly as defined in claim 2 wherein said means for maintaining comprises:

said linkage assembly includes a first link pivotly connected between said first member and a second link, the pivot axis of said second link coinciding with said first pivot axis with said landing gear assembly in said extended position.

4. The aircraft landing gear assembly as defined in claim 1 wherein:

said side brace assembly composed of a pair of members pivotly connected together capable of being located in a substantially in-line position with the landing gear in the extended position and located in a folded side by side position with the landing gear in the retracted position, means for locking together said pair of members when in said in-line position.

5. The aircraft landing gear assembly as defined in claim 1 wherein the means for locking together said pair of members comprises:

a jury strut constructed of a first member and a second member, said first and said second members being pivotly connected together with said first member also being pivotly connected to said one of said pair of members with the second member being also pivotly connected to the other of said pair of members.

6. The aircraft landing gear assembly as defined in claim 5 wherein:

said first and second members of said jury sturt moving with an overcenter toggle action during the movement of said landing gear between the extended position and the retracted position.

7. The aircraft landing gear assembly as defined in claim 5 including:

an actuator connected to said jury strut, said actuator to be capable of normally exerting a force tending to maintain said jury strut in the position to lock together said pair of members with the landing gear in the extended position.

8. The aircraft landing gear assembly as defined in claim 7 wherein:

said actuator comprising a hydraulic cylinder.

9. The aircraft landing gear assembly as defined in claim 8 wherein:

said actuator also including a spring assembly exerting a continuous bias upon said jury strut tending to maintain said pair of members locked together.

10. An aircraft landing gear assembly comprising:

a strut leg assembly comprised of an elongated member having an upper end and a lower end, said upper end to be adapted to be pivotly mounted to the aircraft;

a wheel lever assembly having a first end and a second end, said first end being pivotly connected to said lower end of said strut leg assembly;

a tire supporting axle attached to a short axle, the longitudinal center axis of said tire supporting axle being angularly disposed to the longitudinal center axis of said short axle, said short axle being pivotly mounted on said second end of said wheel lever assembly, means for pivoting said short axle relative to said wheel lever assembly thereby causing said tire supporting axle to be located in different angular positions relative to said wheel lever assembly, said means including a linkage assembly interconnected between said short axle and said strut leg assembly, upon movement of said wheel lever assembly in respect to said strut leg assembly the said linkage causes pivoting of said short axle relative to said wheel lever assembly.

11. The aircraft landing gear assembly as defined in claim 10 wherein:

said linkage assembly comprising a first link pivotly mounted to said strut leg assembly and a second link one end of which is pivotly mounted to said first link and the other end of which is pivotly mounted to a member fixedly mounted to said short axle, a third link one end of which is pivotly connected to said first link and the other end of which is adapted to be pivotly connected to the aircraft, during movement of said wheel lever assembly in respect to said strut leg assembly said third link causes said first link to pivot thereby causing said second link to move resulting in rotation of said short axle.

* * * * *